United States Patent [19]

Nakajima

[11] Patent Number: 5,376,712

[45] Date of Patent: Dec. 27, 1994

[54] HIGH IMPACT STRENGTH POLYAMIDES

[75] Inventor: Nobuyuki Nakajima, Hudson, Ohio

[73] Assignee: The University of Akron, Akron, Ohio

[21] Appl. No.: 119,022

[22] Filed: Sep. 9, 1993

[51] Int. Cl.⁵ .................... C08K 3/36; C08L 77/00; C08L 33/08; C08L 63/00

[52] U.S. Cl. .................... 524/492; 524/493; 524/514; 524/539; 525/183; 525/408; 525/411; 523/436

[58] Field of Search .............. 524/492, 493, 495, 496, 524/514, 539; 525/183, 408, 411; 523/436

[56] References Cited

U.S. PATENT DOCUMENTS

| | | | |
|---|---|---|---|
| 2,468,534 | 4/1949 | Young et al. | 525/184 |
| 2,683,697 | 7/1954 | Newell et al. | 525/183 |
| 4,167,505 | 9/1979 | Dunkelberger | 525/183 |
| 4,174,358 | 11/1979 | Epstein | 525/183 |
| 4,246,371 | 1/1981 | Meyer et al. | 525/183 |
| 4,297,453 | 10/1981 | Coran et al. | 525/408 |
| 4,310,638 | 1/1982 | Coran et al. | 525/183 |
| 4,321,336 | 3/1982 | Meyer et al. | 525/183 |
| 4,335,223 | 1/1982 | Flood et al. | 525/183 |
| 4,346,194 | 8/1982 | Roura | 525/183 |
| 4,356,286 | 10/1982 | Bethea et al. | 525/183 |
| 4,383,083 | 5/1983 | Neilinger et al. | 525/183 |
| 4,423,186 | 12/1983 | Grigio et al. | 525/183 |
| 4,478,978 | 10/1984 | Roura | 525/183 |
| 4,495,324 | 1/1985 | Chacko et al. | 525/183 |
| 4,554,320 | 11/1985 | Reimann et al. | 525/183 |
| 4,562,228 | 12/1985 | Chene et al. | 525/183 |
| 4,619,962 | 10/1986 | Sato | 524/514 |
| 4,661,563 | 4/1987 | Sasaki et al. | 525/183 |
| 4,713,415 | 12/1987 | Lavengood et al. | 525/183 |
| 4,847,330 | 7/1989 | Plachetta et al. | 525/183 |
| 4,849,476 | 7/1989 | Mashita et al. | 525/183 |
| 4,996,264 | 2/1991 | Aonuma et al. | 525/183 |
| 5,212,224 | 5/1993 | Meyer et al. | 525/183 |
| 5,292,808 | 3/1994 | Ohmae et al. | 525/183 |

Primary Examiner—Paul R. Michl
Assistant Examiner—Peter Szekely
Attorney, Agent, or Firm—Hudak & Shunk Co.

[57] ABSTRACT

An impact modified polyamide composition includes a polyamide continuous phase and a rubbery polymer component which is uniformly distributed throughout the polyamide continuous phase in the form of discrete particles, with the rubber polymer component having a flexible backbone and at least about 40 percent of the monomeric units forming the rubbery polymer having pendant polar groups. In accordance with a preferred aspect of the invention, the rubbery component contains a reinforcing filler which provides for an unexpected improvement in retention of flexural modulus.

17 Claims, 3 Drawing Sheets

HIGH IMPACT STRENGTH POLYAMIDES

FIELD OF THE INVENTION

The invention relates to an impact modified polyamide composition and to methods for preparing the same. More particularly, the invention concerns a polyamide blend exhibiting improved impact strength and which is characterized by a relatively high retention of flexural modulus.

BACKGROUND OF THE INVENTION

Thermoplastic polyamides are well-known to have a variety of outstanding properties including resistance to oils and greases, resistance to solvents and bases, fatigue resistance, abrasion resistance, a low coefficient of friction, high tensile strength, and retention of properties over a wide temperature range. However, the impact strength of unmodified polyamides is unsatisfactory for certain applications such as, for example, instrument and tool housings, and for automotive body components.

Plasticizers which have been used to increase impact strength and improve flexibility have associated therewith various well-known disadvantages and are not suitable for imparting good impact strength without dramatically sacrificing rigidity.

U.S. Pat. No. 4,167,505 to Dunkelberger, U.S. Pat. No. 4,495,324 to Chacko et al., and U.S. Pat. No. 4,502,228 to Chen et al. each teach the use of multiphase core/shell type polymer compositions for improving impact resistance. Multiphase core/shell polymers are generally prepared by a relatively complicated and expensive sequential emulsion polymerization process; and, like conventional plasticizers, do not address the problem of providing an impact-modified polyamide which retains a relatively high flexural modulus.

U.S. Pat. No. 4,423,186 to Grigo et al. and U.S. Pat. No. 4,713,415 to Lavengood et al. each teach the use of relatively complicated and expensive polyamide impact modifiers consisting of a copolymer grafted to a diene rubber substrate.

U.S. Pat. No. 4,661,563 to Sasaki et al. and U.S. Pat. No. 4,996,264 to Aonuma et al. each relate to polyamide compositions exhibiting improved impact strength and flexibility. Each of the patents teaches a polyamide composition containing a relatively complicated multiple component impact modifier comprising a crosslinked nitrile rubber, and a crosslinked acrylic rubber or epichlorohydrin rubber. These impact modifiers are intended to also provide for polyamide compositions having increased flexibility and, therefore, do not solve the problem of providing an impact modified polyamide which retains a relatively high flexural modulus.

U.S. Pat. No. 4,321,336 to Meyer et al. and U.S. Pat. No. 4,554,320 to Reimann et al. each relate to polyamide compositions containing a rubbery additive which increases impact resistance and flexibility. Reimann et al. disclose an impact modifier which is a non-crosslinked copolymer having at least 55 percent by weight of ethylene, one or more alkyl acrylates or methacrylates, and at least one monomer possessing an acidic functional group or latent acidic functional group. Meyer et al. disclose an impact modifier which is an aliphatic polyolefin, a copolymer comprising at least 65 percent by weight of an aliphatic monoolefin and a (meth) acrylic acid or ester, a styrene-(meth)acrylic acid-(meth)acrylic ester terpolymer, a diene-acrylonitrile copolymer, or a high molecular weight organic silicon compound. Neither Reimann et al. nor Meyer et al. address the problem of providing an impact modified polyamide composition which retains a relatively high flexural modulus.

SUMMARY OF THE INVENTION

The invention pertains to an impact modified polyamide composition including a polyamide and a rubbery polymer containing high levels of polar moieties, the rubbery polymer being present in the form of particles which are immiscible with the polyamide, but which are surface compatible with the polyamide. The surface compatible rubbery particles are uniformly dispersed as a discrete phase within a polyamide continuous phase or matrix. The surface compatible rubbery phase polymer has a flexible backbone with a high level of pendant polar moieties which are capable of interacting with the carboxamide linkages or moieties in the polyamide to promote good surface compatibility, i.e. adhesion, between the rubbery polymer and the polyamide. In particular, it has been discovered that polyalkylacrylate polymers and/or ethylene-alkylacrylate copolymers containing at least about 40 percent alkylacrylate monomer on a molar basis when uniformly dispersed in the form of small particles in a polyamide matrix provides for dramatic improvement in impact strength. Epichlorohydrin rubber can also be used as the rubbery polymer in accordance with the principles of the invention to provide for a polyamide composition having an immiscible, surface compatible rubbery polymer in particulate form which is uniformly dispersed within a polyamide matrix to provide for dramatic improvements in impact strength.

In accordance with a further aspect of the invention, a surface compatible reinforcing filler in the form of small particles is dispersed within the rubbery polymer particles to provide a polyamide composition which achieves an optimum balance of high impact resistance and high rigidity. Specifically, suitable reinforcing fillers, for achieving the desired combination of properties in concert with a suitable rubbery polymer, include those fillers which are relatively rigid and exhibit good surface adhesion with the rubber, and which are capable of being combined with or distributed within the rubbery polymer component prior to being distributed into the polyamide matrix.

To achieve the desired uniform dispersion and small particle sizes for the rubbery component, optionally containing reinforcing filler, the components are preferably dry blended in comminuted, powder, pellet or granular form and then blended in a high shear mixing apparatus with the polyamide matrix component in the molten state. The high shear blending apparatus preferably has grinding means for further size reduction or comminution of the rubbery particles, optional containing reinforcing filler.

DETAILED DESCRIPTION OF THE PREFERRED EMBODIMENT

Figure 1:
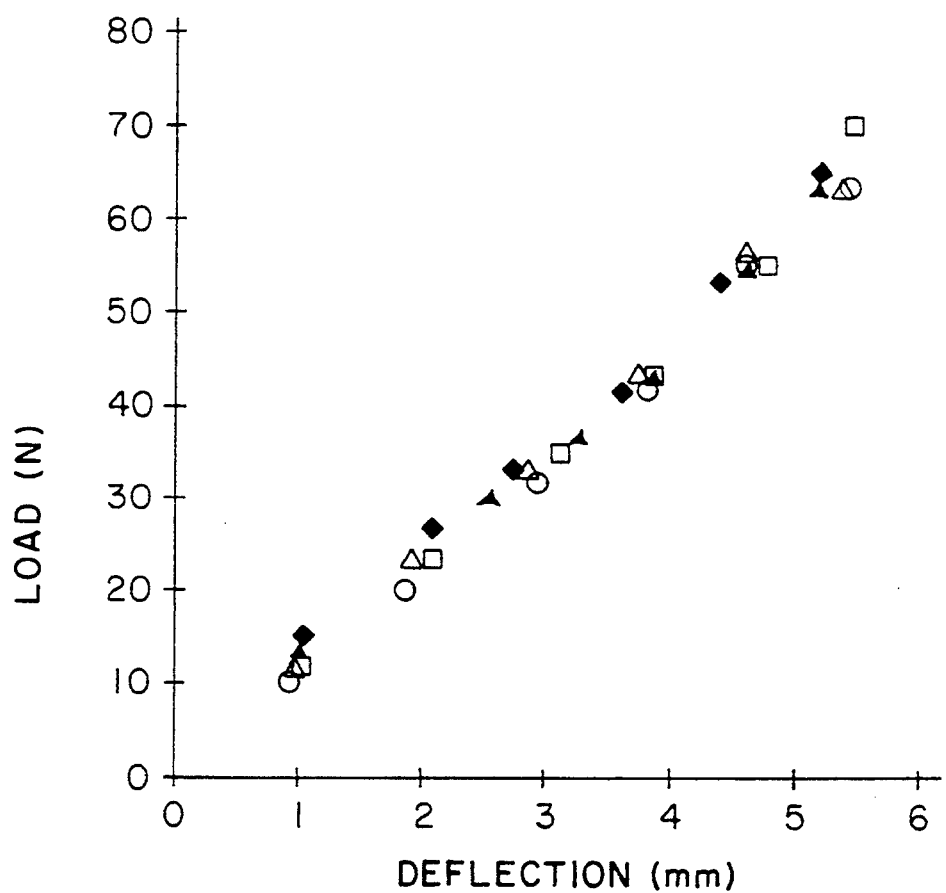
FIG. 1 is a graph of load verses deflection for an unmodified nylon-66 sample.

The polyamide used in the invention can generally be any conventional or known polyamide, including homopolymer resins, copolymer resins, aliphatic polyamides, aromatic polyamides and partially aromatic polyamides, as well as various combinations or blends thereof. Preferred polyamide resins include nylon resins prepared by condensation of equimolar amounts of a saturated dicarboxylic acid with a diamine or by ring opening polymerizations of cyclide amides or lactams. Non-limiting examples of suitable polyamides for use with the invention include nylon-6 (polycaprolactam), nylon-12 (polylaurollactam), nylon-6,6 (polyhexomethyleneadipamide), nylon-6,9 (polyhexamethyleneazelamide, nylon-6-10 (polyhexamethylenesebacamide), nylon-11 (polyaminoundecanoic acid), nylon-6,66 (a copolymer of caprolactam, hexamethlene diamine and adipic acid), nylon-4 [poly($\gamma$-butyrolactam)], nylon-7 [poly (7-aminoheptanoic acid)], nylon-8 [poly($\gamma$-aminocaprylic acid) or poly($\gamma$-aminooctanoic acid)], nylon-10,6 [poly(decamethylene adipamide), numerous partially aromatic nylons which are derived by substituting an aromatic residue or unit in whole or in part for an aliphatic residue or unit in an aliphatic nylon polymer, and any of various aromatic polyamides or polyaramides produced by reacting a diamine with an aromatic diacid chloride such as poly(imino-1,3-phenyleneiminoisophthaloyl) and poly(m-phenylene isophthalamide).

The rubbery polymer component used to improve the impact strength of the polyamide is generally a polymeric material which has a flexible backbone and which has a high level of polar moieties which interact with, but do not react with, the amide linkages of the polyamide to provide for good surface compatibility or adhesion between the rubber polymer component and the polyamide. The rubber polymer component is immiscible with the polyamide and exists as a discrete particulate phase in the polyamide composition of the invention. The rubbery polymers used with the invention also have elastomeric properties including the ability to quickly return to their original shape after deformation or stretching and preferably have a relatively low glass transition temperature such as below typical room temperature and more preferably below about 0° C. or about −20° C. to impart impact resistance to the polyamide composition even at lower outdoor temperatures typically encountered during the winter season at temperate latitudes.

Suitable polymers for use as the rubber component of the composition include acrylic rubbers and polyepichlorohydrin rubbers.

Preferred acrylic rubbers include homopolymers and copolymers comprising at least 40 percent, and more preferably at least 50 percent or 60 percent, on a molar basis, of at least one vinyl addition monomer which is free of carboxyl and hydroxyl groups and which contains a polar moiety. The preferred polar moiety-containing vinyl addition monomers include acrylonitrile and alkyl acrylates containing from 2 to about 12 carbon atoms. Nonlimiting examples of suitable alkyl acrylate monomers include ethyl acrylate, propyl acrylate, n-butyl acrylate, isobutyl acrylate, n-pentyl acrylate, iso-amyl acrylate, n-hexyl acrylate, 2-methyl-pentyl acrylate, n-octyl acrylate, 2-ethylhexyl acrylate, n-decyl acrylate, n-dodecyl acrylate, n-octadecyl acrylate and the like, with the lower molecular weight acrylates being particularly preferred and with ethyl acrylate being the most preferred.

The preferred acrylic rubbers can optionally include up to about 60, and more preferably less than about 50 percent or less than about 40 percent, on a molar basis of a vinyl addition comonomer which when copolymerized with the polar moiety-containing vinyl addition monomers are free of pendant polar moieties. Preferred vinyl addition comonomers which are free of pendant polar moieties include polymerizable lower molecular weight monoolefins containing from 2 to about 4 carbon atoms, with ethylene being most preferred.

Optionally, the acrylic rubbers can contain minor amounts of a crosslinkable vinyl addition monomer which is copolymerizable with the polar moiety-containing vinyl addition monomers and the optional vinyl addition comonomers free of pendant polar moieties, and which renders the acrylic rubber polymers and copolymers vulcanizable. Suitable crosslinkable monomers known to the art include nonconjugated dienes such as alkylidenenorbornene, alkenylnorbornene, dicyclopentadiene, methylcyclopentadiene; conjugated dienes such as butadiene and isoprene; epoxy group-containing ethylenically unsaturated compounds including alkyl glycidyl ether, glycidyl methacrylate and glycidyl acrylate; active halogen-containing ethylenically unsaturated compounds such as vinyl benzyl chloride, vinyl benzyl bromide, 2-chloroethyl vinyl ether, vinyl chloroacetate, vinyl chloropropionate, alkyl chloroacetate, alkyl chloropropionate, 2-chloroethyl acrylate, 2-chloroethyl methacrylate, chloromethyl vinyl ketone and 2-chloroacetoxy-methyl-5-norbornene; and carboxyl group-containing ethylenically unsaturated compounds including acrylic acid, methacrylic acid, crotonic acid, 2-pentenoic acid, maleic acid, fumaric acid, and itaconic acid.

There is no particular limit to the amount of crosslinkable monomer employed in the composition, but such crosslinkable monomers are preferably present, if at all, at lower amounts such as less than 10 percent or 5 percent, and more preferably less than 2 percent or 1 percent, on a molar basis, based on the total monomers used to polymerize the acrylic rubber polymer.

When crosslinkable monomers are used in the acrylic rubber polymers and copolymers of the invention, the resulting vulcanizable rubber can be crosslinked by adding a vulcanizing agent, most preferably to the dry blended composition prior to the high shear blending conducted with the polyamide in the molten state to effect crosslinking or vulcanization during the high shear blending.

Examples of suitable vulcanizing agents include sulfur vulcanizing agents and organic peroxides for crosslinking pendant vinyl groups when, for example, a diene crosslinkable monomer is used; an organic ammonium salt, an organic phosphonium salt, a dithiocarbonic acid salt, a polyamine carbamate or a combination thereof with a polycarboxylic acid compound or a combination of an alkali metal salt of an organic carboxylic acid with a sulfur compound or the like when, for example, an epoxy group containing crosslinkable monomer is used, an organic ammonium salt, an organic phosphonium salt, a polyamine-carbamate, a combination of an alkali metal salt of an organic carboxylic acid with a sulfur compound or the like when, for example, an active halogen-containing crosslinkable monomer is used; or a metal oxide, a polyepoxide, a polyisocyanate, a phenolic resin, an azirdine, a carbodiimide or the like, for example, when a crosslinkable monomer containing a carboxy group is used.

The acrylate rubbers can be prepared using emulsion (latex), suspension, solution and bulk techniques known to those skilled in the art. The polymerization can be performed as a batch reaction or one or more ingredients can be proportioned during the manufacturing process. Temperature of polymerization ranges from about −10° C. to about 100° C., whereas a more preferred range is from about 5° C. to about 80° C.

The polymerization can be initiated by free-radical generating agents. Examples of such agents are organic peroxides and hydroperoxides such as benzoyl peroxide, dicumyl peroxide, cumene hydroperoxide, paramethane hydroperoxide, and the like, used alone or with redox systems; diazo compounds such as azobisisobutyro-nitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like.

Typical emulsion polymerization ingredients would include a persulfate salt or organic peroxide and usually a redox system, water adjusted to the desired pH with acids or basis and usually buffered with inorganic salts, and either anionic, cationic, or nonionic surface active agents well known in the art.

The polymerization is typically continued until a relatively high (for example about 70, 80 or 90 percent) conversion of the monomers is obtained. The resulting latex (if the emulsion process is employed) can be coagulated to isolate the polymer. Typical coagulation procedures are salt-acid coagulations, use of polyvalent metal salts such as magnesium sulfate (MgSO4) or calcium chloride, use of alcohols such as methanol, isopropyl alcohol, and freeze agglomeration techniques. The rubber is then usually washed with water and dried.

Optionally, the acrylic rubbers can be admixed with cure ingredients and compounding ingredients using conventional equipment such as a Banbury mixer, extruders, and the like.

When preparing a vulcanizable acrylic rubber composition, the polymer can be mixed with curing agents in the Banbury mixer or the conventional equipment, or can, and more preferably is mixed with the optimal curing agents in high shear mixing apparatus with the molten polyamide to form the modified polyamide compositions of the invention. The acrylic rubber polymer can also be compounded, if desired, with other conventional ingredients such as carbon blacks, other fillers, antioxidants, emulsifiers, plasticizers, retarders, accelerators, and the like as is conventionally known in the art.

Suitable epichlorohydrin rubbers include epichlorohydrin homopolymers and copolymers, optionally containing crosslinkable monomers. Non-limiting examples of suitable epichlorohydrin rubbers include polyepichlorohydrin, poly (epichlorohydrin-co-ethylene oxide), poly (epichlorohydrin-co-allyl glycidyl ether), poly (epichlorohydrin-co-propylene oxide), poly(epichlorohydrin-co-ethylene oxide-co-allyl glycidyl ether), and the like. Diamine compounds and triazine compounds may be used as crosslinking agents for the hydrin rubber. If a copolymer of epichlorohydrin and allylglycidyl ether is used as the hydrin rubber, sulfur compounds or maleimide, for example, can be used as crosslinking agents.

Polymerization of epichlorohydrin rubber is generally carried out in a solution process at 40°–130° C. utilizing an aromatic solvent such as benzene or toluene. The catalyst systems employed are alkylaluminum-water and alkylaluminum-water-acetylacetone. Chain propagation is believed to follow a cationic, coordination mechanism. The product may be isolated by aqueous coagulation. Alternative polymerization systems in bulk and by means of hydrocarbon slurries have been reported.

Epichlorohydrin rubber is generally produced in a continuous process whereby solvent, catalyst, and monomer are fed to a back-mixed reactor maintained at the desired temperature. A uniform product composition is achieved by maintaining a constant monomer concentration in the reactor through adjustments in the catalyst feed rate. The desired product compositions can be obtained by controlling the unreacted or background monomer concentrations in the reactor. Molecular weight of the homopolymer is controlled by the polymerization temperature. Molecular weight of the copolymers and terpolymer is controlled by addition of organic acid anhydrides and organic acid halides.

The most widely used cross-linking agent for epichlorohydrin elastomers is 2-mercaptoimidazoline, also called ethylenethiourea. Other commercially available cross-linking systems include derivatives of 2,5-dimercapto-1,3,4-thiadiazole, trithiocyanuric acid and derivatives and polyphenols. Diamines, carbamates of diamines, and other substituted thioureas have also been used.

Other cross-linking agents include 2–4-dithiohydantoin and derivatives, 2,3-dimercaptopyrazine and derivatives, organic salts of 1,8-diazabicyclo[5.4.0]-undec-7-ene, 4,4'-[2,2,2-trifluoro-1-(trifluoromethyl)ethylidene]bisphenol, sodium sulfide and 1,10-decanediolbis(diazoacetate). The reaction product of ethyl chloride, ammonia, and formaldehyde along with sulfur; glycerol with metal cyanates; pyrimidinethiones; triazinethiones; thiazolinethiones; tetramethylthiuram disulfide, morpholine disulfide, and sulfur; sulfur, potassium sebacate, and poly(ethylene oxide); and various amino acids have also been reported as curing agents.

Commonly used acid acceptors include metal oxides such as red lead oxide, magnesium oxide, and calcium oxide; lead salts such as lead carbonate, lead phthalate, and lead phosphite; metal stearates such as calcium stearate and zinc stearate; and other basic carbonates such as barium carbonate and calcium carbonate. Specific combinations of cross-linking agents and acid acceptors are well known to the art and the literature.

The epichlorohydrin elastomers can be compounded with fillers, plasticizers, processing aids, stabilizers, vulcanizing agents and other conventional ingredients. These ingredients may be added on a two-roll mill or in an internal mixer, such as a Banbury mixer.

In accordance with a preferred aspect of the invention, a surface compatible reinforcing filler, which is capable of being dispersed into the rubbery polymer component in the form of small particles, is used to provide an unexpected improvement of the flexural modulus of the impact modifier polyamide composition of the invention. Suitable reinforcing fillers for use with the invention generally include any surface active carbon black or silica. Especially preferred are spray dried silica, such as those sold under the trademark "Ultrasil VN 3 SP" (a synthetic amorphous precipitated silica) available from Degussa Corporation. Spray-dried silica were found to be more easily dispersed in the rubbery polymer particle component than rotary-dried silica. A suitable silica for achieving the desired objectives of the invention had a surface area of about 175 m$^2$/g, a moisture content of about 6 percent by weight, a specific gravity of about 2.1, a pH of about 6.3 and silicon dioxide content (dry basis) of about 98 percent. The reinforcing filler, when used, is preferably compounded with, combined with, or distributed within the rubbery polymer component using conventional mixing apparatus such as a Banbury mixer or two-roll mill.

The polyamide compositions of the invention and the properties thereof can be modified as desired by addition of various known additives commonly used in the formulation of polyamide resin compositions. Examples of additives which can be used with the invention include conventional amounts of clay, titanium dioxide, calcium carbonate, pigments, coloring agents, zinc oxide, stearic acid, antioxidants, stabilizers, lubricants, foaming agents, plasticizers, extenders, coupling agents, glass or other fibers, and the like. It is preferred that the above-described additives, if used, be added to the polyamide composition prior to high shear blending of the molten polyamide along with the rubbery polymer component and the optional reinforcing filler.

The polyamide compositions of the invention are preferably prepared by dry mixing of the individual components in any conventional and convenient manner. Most preferably, the polyamide, rubbery polymer component (optionally combined with or containing a reinforcing filler), optional curing agents and any other desired conventional additives are admixed in a comminuted form such as powders, chips, pellets or the like using any of various conventional manual or mechanical mixing apparatus such as by tumbling in a drum. The dry or physical admixture is then preferably melt blended at a temperature sufficient to melt the polyamide component but not so high as to cause appreciable decomposition of the polyamide or rubbery polymer particles during the melt blending. A suitable temperature range for melt blending the composition of the invention is from about 260° C. to about 330° C. The melt blending operation is preferably performed using high speed apparatus which minimizes the time during which the polyamide is in a molten state so as to minimize any decomposition which might occur. The melt blending can be carried out using any of a variety of conventional means for producing a homogeneous composition. Suitable means for melt blending the compositions of the invention include an internal kneader or kneader-extender such as a Banbury mixer or kneader, a Brabender mixer, a multi-screw extruder such as a Werner and Pfleiderer twin-screw extruder, or other mixing apparatus suitable for plasticizing synthetic resins. High-shear melt blending apparatus capable of reducing the diameters of the dispensed particles are preferred. Especially preferred are intermeshing twin-screw extruder type apparatuses. The components are mixed until the rubber component and optional reinforcing filler are sufficiently reduced in size and sufficiently uniformly distributed within the composition to achieve the desired properties of the invention. The product is preferably extruded in strands, sheets or the like and the extrudate is preferably chipped or pelletized to whatever form is desired for ultimate use.

As a result of the thorough mixing or blending achieved by the melt blending means, the rubber polymer component, optionally containing reinforcing filler, is uniformly dispersed within the polyamide matrix in the form of individual particles desirably having an average overall particle size of less than 10 or 20 $\mu$m and more preferably less than 5 or 10 $\mu$m.

The proportions in which the rubber polymer component and optional reinforcing filler are utilized in the polyamide compositions of the invention can vary over a wide range, the important consideration being that the amount of the rubbery polymer component is sufficient to produce an impact resistance-enhancing effect, and that the amount of reinforcing filler is used in an amount sufficient to produce an enhanced flexural modulus. The amount of rubbery polymer component and optional reinforcing filler needed to provide an enhanced impact resistance effect and an enhanced flexural modulus will vary depending upon the particular polyamides, rubbery polymer components, and reinforcing fillers used. In general, the amount of rubbery polymer component needed to produce an impact resistance enhancing effect is in the range from about 5 to about 50 parts by weight per 100 parts by weight of the polyamide, and the amount of reinforcing filler needed to provide an enhancing effect on the flexural modulus is generally in the range between about 5 to 70 parts by weight of reinforcing filler per 100 parts by weight of the rubber.

The moldable thermoplastic polyamide compositions of the invention are useful for the production of high-impact resistant molded articles; and high-impact resistant, high flexural modulus molded articles which are subjected to relatively high loads. Exemplary uses include housings for cameras, electronic equipment and instruments; sports equipment such as sports racquets; and automotive components such as headlight housings.

The invention can be more fully understood by reference to the following non-limiting examples.

General purpose nylon-66, "ZYTEL 101," and "Super Tough" nylon-66, "ZYTEL ST 801," were obtained from E. I. du Pont de Nemours & Company (Inc.). The elastomer or rubber polymer component used in this example was poly(ethyl acrylate), "HYCAR 4051," was obtained from the Nippon Zeon company. The elastomer had a glass transition temperature (as determined by differential thermal analysis) of about $-14°$ C., a specific gravity of about 1.10 and a gel content of 0 percent. The silica employed in this example was "Ultrasil VN 3 SP" synthetic amorphous precipitated silica (spray-dried type) from Degussa Corporation.

To successfully process the nylon materials, drying is required. As recommended by the manufacturer, the nylons were vacuum dried in a vacuum oven at 80° C. for a period of 20 hours just prior to processing. The dried polyamides were kept in a desiccator (for a maximum of 3 hours) before use to prevent exposure to atmospheric moisture. Drying avoids a possible loss in properties due to presence of moisture. If the nylon molding resin is allowed to absorb water prior to molding, the melt viscosity and the appearance of molded parts are affected. Moreover, the molecular weight and toughness of the resin decrease when the polymer is exposed to moisture.

Preparation of Nylon-Poly(Ethyl Acrylate) Blend

The general purpose nylon-66, after being vacuum dried at 80° C. for 20 hours, was dry blended with poly(ethyl acrylate) in the proportion of 80 percent by weight of nylon and 20 percent by weight of rubber. The dry-blended composition was then further blended using a Japan Steel Work (JSW) twin screw extruder having an intermeshing and co-rotating system. The high shear, grinding action of the intermeshing screw extruder facilitates a short residence time, which avoids thermal degradation of the product. The intermeshing screws also enable a high pressure build-up over a short length. The corotating screws can provide high speed, strong shearing forces and high outputs. With the screws rotating in one direction, the materials are transferred from one screw to the other and undergoes a constant mixing. This phenomena is important for mixing and for heat transfer from or to the surrounding inner wall.

The feed rate of a feeder transporting the blend of nylon and poly(ethyl acrylate) into the extruder through a hopper was 130 g/min. Screw rpm in the operation was 200 rpm. The residence time of the materials in the extruder was approximately 5-6 minutes. The temperatures in the barrel of the extruder were set at 260° C. and 270° C. in the feeding zones. Temperatures in barrel zones 3 through 7 and the die temperature were set at 280° C. The extrudate of the blend was quenched in cold water after coming out from the die and then was pelletized in a plastic chopper. The pellets of the blend were kept for impact strength and flexural modulus tests.

Preparation of Nylon, Poly(Ethyl Acrylate) and Silica Blend

Precipitated silica was mixed with poly(ethyl acrylate) rubber in the ratio of 100 parts by weight of the elastomer and 25 parts by weight of the silica. First, the poly(ethyl acrylate) was masticated in a Haake Buchler Rheocord System 40 laboratory internal mixer with Banbury type rotors at 50 rpm and a machine temperature of 100° C. After one to two minutes of mastication, precipitated silica was added in the internal mixer over a period of 3 minutes. An additional 6 minutes was required to complete the mixing.

Secondly, the silica-filled poly(ethyl acrylate) elastomer was dry blended with predried general purpose nylon-66 and fed into a JSW twin screw extruder under the same conditions as used in previous blending method. The extrudate of the blend was quenched in water and, then, cut into pellet form in a plastic chopper. These pellets were kept for impact strength and flexural modulus tests. The resulting blend comprised approximately 80 percent by weight of nylon-66, 16 percent by weight of poly(ethylacrylate) and 4 percent by weight of silica.

Injection Molding

The blend of nylon and poly(ethyl acrylate), the blend of nylon and poly(ethyl acrylate) and silica, general purpose nylon-66, and "Super Tough" nylon-66 in pellet form were vacuum dried at 80° C. for 20 hours before being injection molded in a Boy 15S injection molding machine containing a 24 mm diameter reciprocating screw. The barrels of the machine were electrical heated to 280° C. The specimen of each sample ejected from the injection molding machine had the shape of a rectangular bar with approximate dimensions of 127 mm×12.7 mm×32 mm.

Injection pressure is hydraulically supplied and settings were monitored through machine integral hydraulic sensors and controls. The overall cycle time for molding each blend was approximately 30 seconds. After a sample was injected into the mold, it was cooled for roughly one minute in the mold before the ejection.

Impact Strength Tests

Pellets of nylon/poly(ethyl acrylate)/silica blend, nylon/poly(ethyl acrylate) blend, general purpose nylon-66, and "Super Tough" nylon-66 were compression molded into notched impact bars using Wabash compression molding machine at 280° C. A pendulum type impact tester was employed to investigate impact strength of the specimens under conditions claimed in ASTM D256-90b. Five specimens of each sample were vacuum dried at 80° C. for 20 hours before testing. The test was done at 22° C. The average values were reported for the impact strength for each sample.

Flexural Modulus Tests

Specimens of rectangular bar of nylon/poly(ethyl acrylate) blend, nylon/poly(ethyl acrylate)/silica blend, general purpose nylon-66, and "Super Tough" nylon from injection molding were used in flexural modulus test. The test was performed by a Monsanto Universal Tensiometer, Model T-10, which equipped with a three point flexural testing fixture. The support span length of the fixture is 70.0 mm. The test was carried out as defined in ASTM standard D790-90. The crosshead speed used in the test was 0.025 mm/s. A Gaertner optical micrometer was employed in measuring the deflection of the specimens during the test. Five specimens of each sample were examined in the test to check the reproducibility. The investigation was done at 23° C. The forces and deflections were recorded for further calculation of the flexural modulus. The modulus of elasticity from three-point bending apparatus was calculated by using the steepest initial slope of the load-deflection curve and the following equation:

$$E_B = L^3 m / 4bd^3$$

where $E_B$ is modulus of elasticity, L is support span of three-point bending equipment, b is width of the beam tested, d is depth of the beam tested, and m is slope of the tangent to the initial straight line portion of the load-deflection curve.

Flexural Modulus and Impact Strength

FIG. 1 shows the reproducibility of data from modulus test of five injection molded general purpose nylon samples. The figure shows the load-deflection curves of all the samples over small deflection. This plot indicates that the deflection increases linearly with the increase in load. The data does not scatter greatly in these samples.

Figure 2:
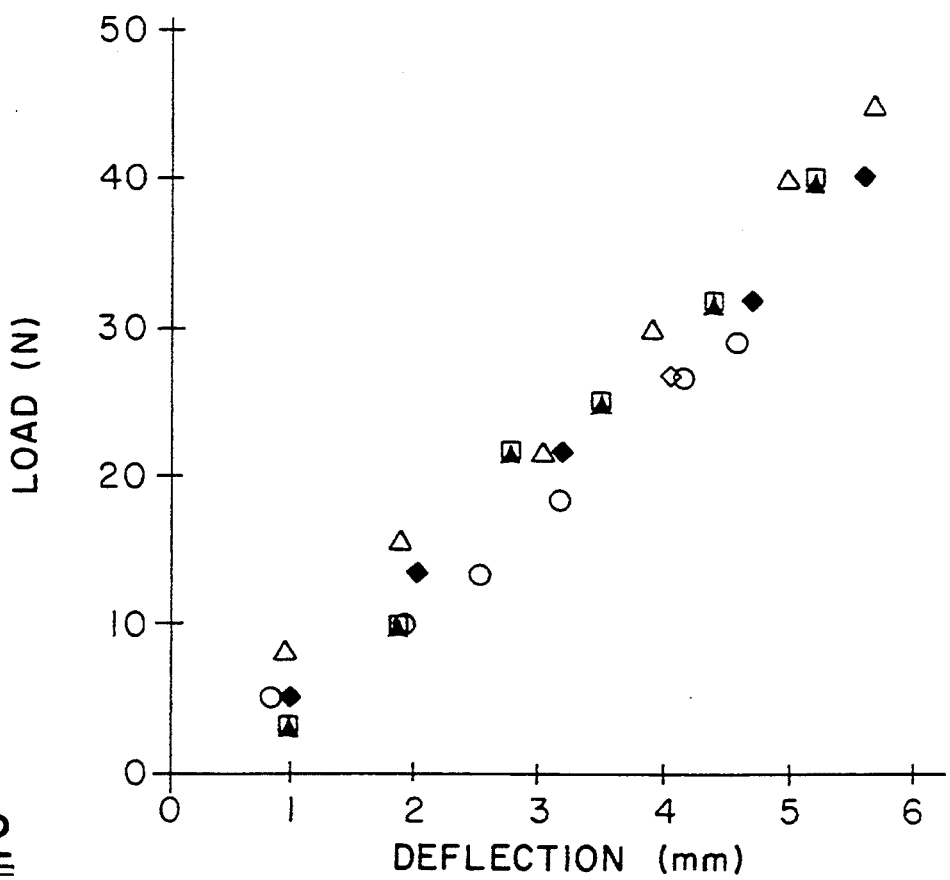
FIG. 2 is a graph of load verses deflection for "Super Tough" nylon-66 sample.
Figure 3:
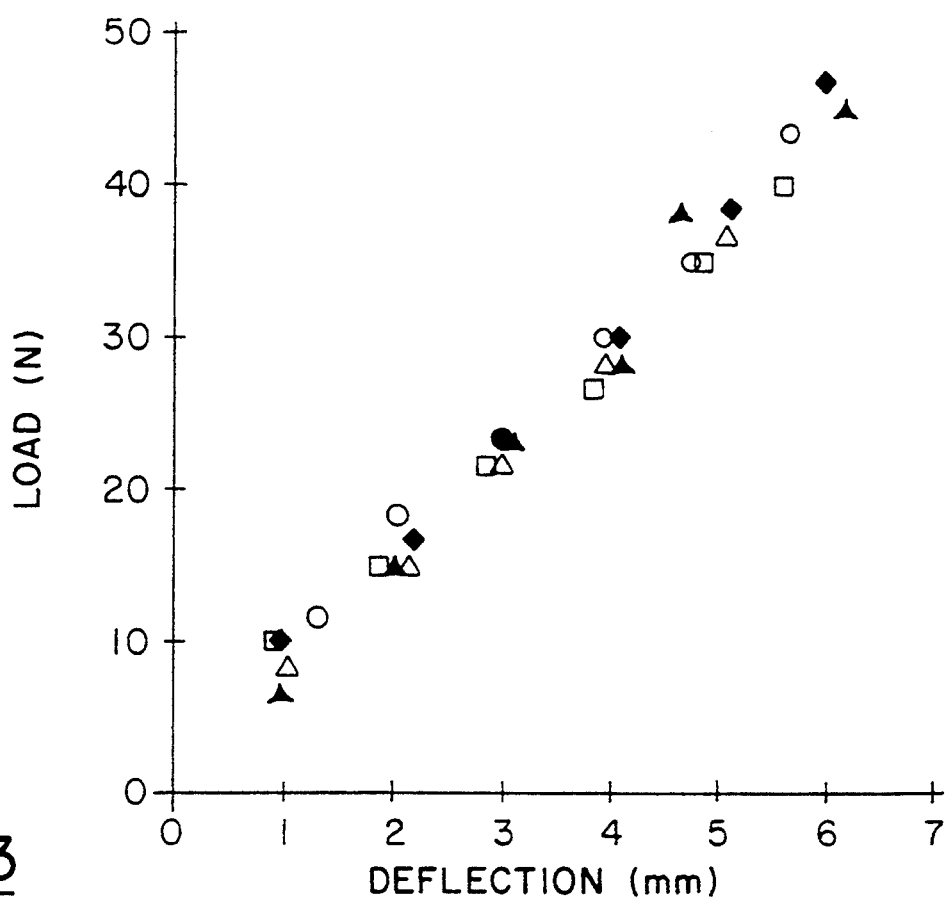
FIG. 3 is a graph of load verses deflection for an impact modified polyamide sample in accordance with the invention.
Figure 4:
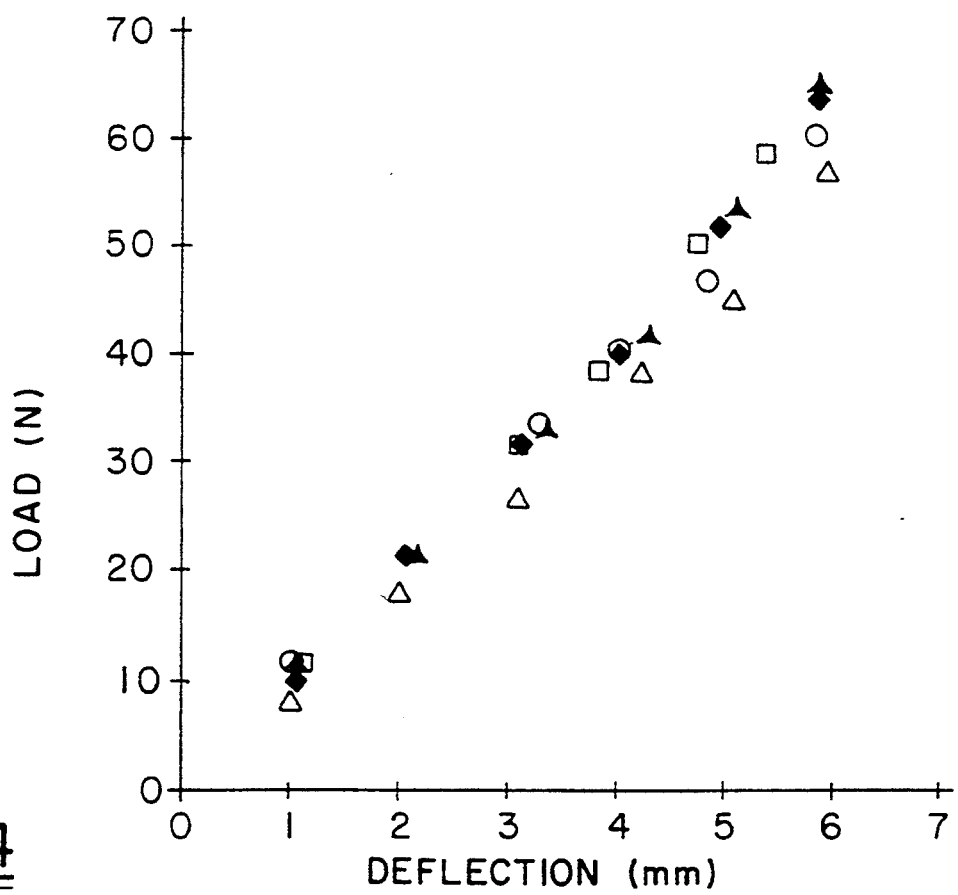
FIG. 4 is a graph of load verses deflection for an impact modified polyamide sample, wherein the impact modifying rubbery polymer component contains a silica reinforcing filler in accordance with a preferred aspect of the invention.

Reproducibility of the data on flexural modulus test for "Super Tough" nylon, the blend of general purpose nylon and poly(ethyl acrylate), and the blend of general purpose nylon, poly(ethyl acrylate) and silica are shown in FIGS. 2, 3, and 4, respectively. The samples of "Super Tough" nylon shows a greater scatter in data than the other two blends in FIG. 3 and FIG. 4, while the two nylon/poly(ethyl acrylate) blends show the same degree of scatter. All figures clearly show that the deflection in bending linearly increases with increasing load.

Figure 5:
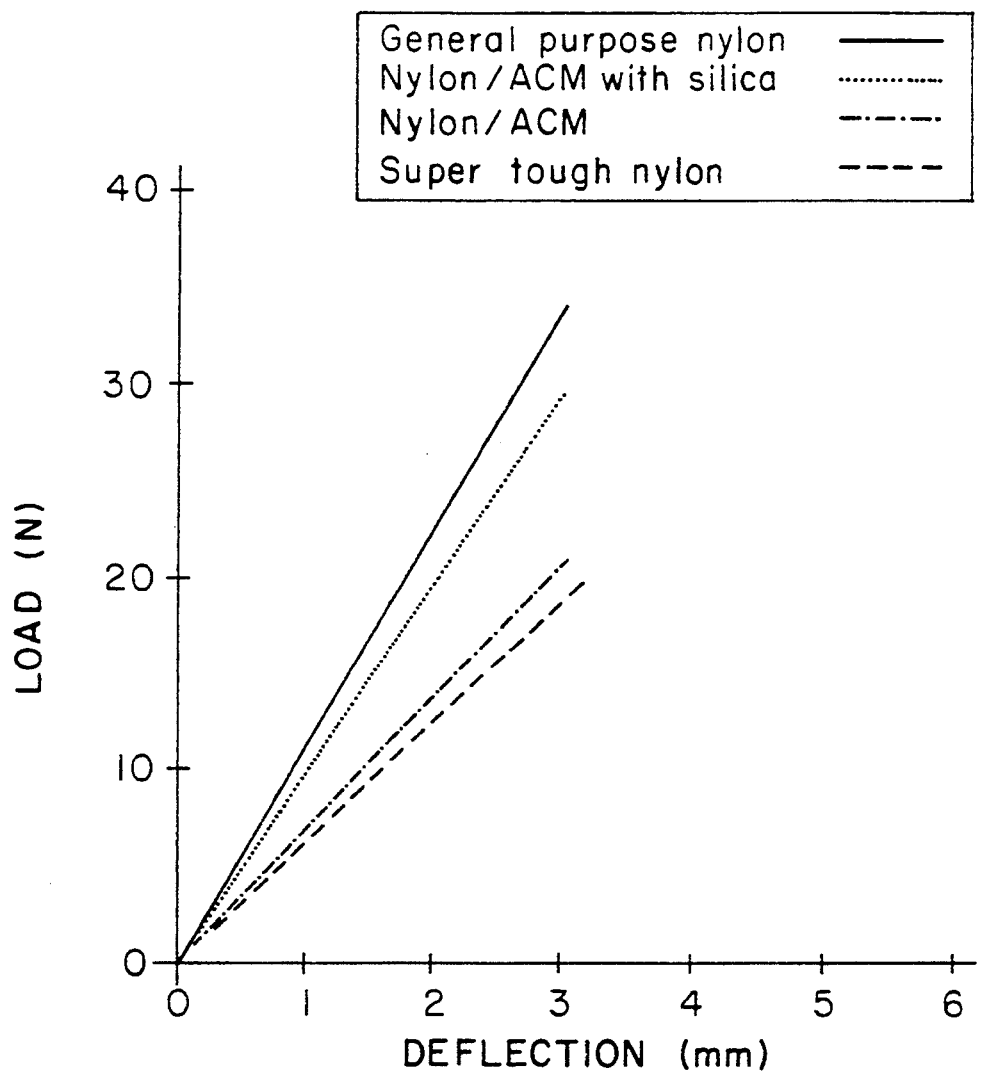
FIG. 5 is a graph comparing the average load verses deflection for each of the samples of FIGS. 1 through 4.

The comparison of average data on load-deflection curves of general purpose nylon, "Super Tough" nylon, nylon/poly(ethyl acrylate) blend, and nylon/poly(ethyl acrylate)/silica blend over small range of deflection is shown in FIG. 5. The figure shows the initial slopes of the load-deflection curves which were utilized for computation of flexural modulus.

Table I shows average values of impact strength data and flexural modulus of general purpose nylon-66, "Super Tough" nylon, nylon/poly(ethyl acrylate) blend, and the blend of nylon, poly(ethyl acrylate) and silica.

TABLE I

Impact Strength and Flexural Modulus of Nylon-66 Blends

| Ingredients | Impact Strength (J/m) | Flexural Modulus (MPa) |
|---|---|---|
| Nylon-66 | 48 | 2.61 |
| "Super Tough" Nylon | 829 | 1.51 |
| Nylon-66 and ACM (80/20) | 533 | 1.64 |
| Nylon-66 and ACM and Silica (80/16/4) | 416 | 2.24 |

While in accordance with the Patent Statutes, a preferred embodiment and best mode has been presented, the scope of the invention is not limited thereto, but rather is measured by the scope of the attached claims.

What is claimed is:

1. An impact modified polyamide composition comprising:
    a polyamide continuous phase; and
    a rubbery polymer component distributed throughout the polyamide in the form of discrete particles, said rubbery polymer component having a flexible backbone with at least about 50 percent of the monomeric units forming the rubbery polymer being acrylonitrile, one or more alkyl acrylates, or a combination thereof, the balance, if any, of the monomeric units forming the rubbery polymer consisting essentially of monoolefins;
    a reinforcing filler dispersed within said rubbery polymer component.

2. The composition of claim 1, wherein said at least 50 percent of the monomer units are ethyl acrylate, propyl acrylate, butyl acrylate, or a combination thereof.

3. The composition of claim 2, wherein said comonomer is a monoolefin containing from 2 to about 4 carbon atoms.

4. The composition of claim 2, wherein said rubbery component is a copolymer comprising at least 50 percent, on a molar basis, of ethyl acrylate and up to 50 percent, on a molar basis, of ethylene.

5. The composition of claim 1, wherein said rubbery polymer component includes a minor amount of a crosslinkable vinyl addition monomer to impart crosslinkability.

6. The composition of claim 1, wherein said composition exhibits an impact strength of at least about 530 J/m and a flexural modulus of at least 1.6 GPa.

7. The composition of claim 1, wherein said reinforcing filler is selected from the group consisting of carbon black and silica.

8. The composition of claim 1, wherein said reinforcing filler is a spray dried silica having a surface area of about 175 m²/g.

9. The composition of claim 1, wherein said composition exhibits an impact strength of at least about 415 J/m and a flexural modulus of at least 2.2 GPa.

10. An impact modified polyamide composition comprising:
    a polyamide continuous phase;
    a rubbery polymer component uniformly distributed throughout the polyamide in the form of discrete particles, said rubbery component having a glass transition temperature below about 0° C., with at least about 50 percent of the monomeric units forming the rubber polymer being acrylonitrile, one or more alkyl acrylates, or a combination thereof, the balance, if any, of the monomeric units forming the rubbery polymer consisting essential of monoolefins; and
    a reinforcing filler dispersed within said rubbery polymer component.

11. The composition of claim 10, wherein said composition has an impact strength of at least about 415 J/m and a flexural modulus of at least 2.2 GPa.

12. An impact modified polyamide composition comprising:
    a polyamide continuous phase; and
    an epichlorohydrin rubber component distributed throughout the polyamide in the form of discrete particles, said epichlorohydrin rubber containing a reinforcing filler dispersed therein.

13. The composition of claim 12, wherein said epichlorohydrin rubber is a copolymer of epichlorohydrin and ethylene oxide, allyl glycidyl ether, propylene oxide, or combinations thereof.

14. The composition of claim 12, wherein said reinforcing filler is selected from the group consisting of carbon black and silica.

15. The composition of claim 12, wherein said reinforcing filler is a spray dried silica having a surface area of about 175 m²/g.

16. The composition of claim 6, wherein said reinforcing filler is dispersed within said rubbery component only, and not in said polyamide.

17. The composition of claim 12, wherein said reinforcing filler is dispersed within said rubbery component only, and not in said polyamide.

* * * * *